United States Patent [19]

Helmstetter

[11] Patent Number: 5,611,418
[45] Date of Patent: *Mar. 18, 1997

[54] APPARATUS FOR INTERFACING INDEXING AND CONTINUOUS MOTION MACHINES AND METHOD OF UTILIZING APPARATUS

[76] Inventor: Thomas J. Helmstetter, 145 Middlesex Ave., Piscataway, N.J. 08854

[ * ] Notice: The term of this patent shall not extend beyond the expiration date of Pat. No. 5,271,489.

[21] Appl. No.: 542,426

[22] Filed: Oct. 12, 1995

Related U.S. Application Data

[63] Continuation of Ser. No. 127,537, Sep. 28, 1993, abandoned, which is a continuation of Ser. No. 857,217, Mar. 25, 1992, Pat. No. 5,271,489.

[51] Int. Cl.⁶ .................................................... B65G 1/00
[52] U.S. Cl. ........................... 198/347.1; 198/594
[58] Field of Search ........................... 198/347.1, 460.1, 198/594, 461.1

[56] References Cited

U.S. PATENT DOCUMENTS

| | | | |
|---|---|---|---|
| 2,932,376 | 4/1960 | Millington | 198/594 X |
| 4,325,475 | 4/1982 | Spalding . | |
| 4,549,647 | 10/1985 | Cosse | 198/594 X |
| 5,097,939 | 3/1992 | Shanklin | 198/460 X |

FOREIGN PATENT DOCUMENTS

| | | | |
|---|---|---|---|
| 236057 | 9/1977 | Denmark . | |
| 0035813 | 9/1981 | European Pat. Off. | 198/347.1 |
| 0292378 | 11/1988 | European Pat. Off. . | |
| 2529180 | 12/1983 | France . | |
| 2583394 | 12/1986 | France . | |
| 2618905 | 11/1977 | Germany | 198/594 |
| 2730864 | 1/1979 | Germany . | |
| 3238888 | 4/1984 | Germany | 198/347.1 |
| 4032533 | 4/1992 | Germany . | |
| 0201723 | 9/1987 | Japan | 198/347.1 |
| 2097744 | 11/1982 | United Kingdom | 198/347.1 |
| 2124574 | 2/1984 | United Kingdom | 198/347.1 |

OTHER PUBLICATIONS

Australian Examiner's First Report issued Sep. 16, 1994 regarding a corresponding foreign application pending before the Australian Patent Office.

*Primary Examiner*—James R. Bidwell
*Attorney, Agent, or Firm*—Juettner Pyle Lloyd & Piontek

[57] ABSTRACT

An apparatus and method for facilitating the interfacing between indexing motion and continuous motion machines wherein interfacing structure is provided by a continuous motion interfacing loop conveyor which is operatively interposed between the discharge end of an indexing conveyor of the intermittent motion machine and an article-receiving end of a continually advancing receiving conveyor of the continuous motion machine. The interfacing loop conveyor has a reciprocatory or oscillating motion component superimposed on the continuous advance thereof proximate the article-discharging end of the indexing conveyor so as to correlate the relative speeds between the advance of the interfacing conveyor and that of the indexing conveyor end from which the articles of manufacture are transferred to the interfacing conveyor so as to produce a uniform transfer of the articles to the interfacing conveyor, and a continuous advance of the articles to the receiving conveyor of the continuous motion machine.

13 Claims, 4 Drawing Sheets

APPARATUS FOR INTERFACING INDEXING AND CONTINUOUS MOTION MACHINES AND METHOD OF UTILIZING APPARATUS

This application is a continuation of application Ser. No. 08/127,537 filed on Sep. 28, 1993, now abandoned a continuation of Ser. No. 07/857,217 filed on Mar. 25, 1992, now issued as U.S. Pat. No. 5,271,489.

BACKGROUND OF THE INVENTION

Field of the Invention

The present invention relates to the aspect of enabling the interfacing of an intermittent motion or indexing machine which includes an indexing conveyor discharging intermittently or batchwise advanced discrete articles of manufacture with a continuous motion machine including a continually advancing receiving conveyor which is adapted to convey the articles of manufacture in a continuous motion towards subsequent workstations for further processing and/or packaging of the articles.

More particularly, the invention is directed to an apparatus facilitating the interfacing between the indexing motion and continuous motion machines wherein interfacing structure is provided by a continuous motion interfacing loop conveyor which is operatively interposed between the discharge end of the indexing conveyor of the indexing motion machine and an article-receiving end of the continually advancing receiving conveyor of the continuous motion machine, and wherein the interfacing loop conveyor has a reciprocatory or oscillating motion component superimposed on the continuous advance thereof proximate the article-discharging end of the indexing conveyor so as to correlate the relative speeds between the advance of the interfacing conveyor and that of the indexing conveyor end from which the articles of manufacture are received by the interfacing conveyor to thereby produce a uniform transfer of the articles to the interfacing conveyor, and a continuous advance of the articles to the receiving conveyor of the continuous motion machine.

Moreover, the invention is also directed to the provision of a method of interfacing an indexing motion machine with a continuous motion machine utilizing the inventive interfacing apparatus.

In essence, the invention is directed to facilitating an interfacing function between an indexing motion machine and a continuous motion machine, whereby a series of articles of manufacture; which by way of example only, may be incontinent pads which are basically shallow-constructed flexible foamed sheet material items, are advanced intermittently or in indexed batches by an indexing conveyor from an indexing motion manufacturing machine, but which are to be conveyed in a continuous manner and in uniformly spaced succession towards further workstations which may optionally entail the use of some or all of tape application units, folding structures and/or packaging devices for finishing and packaging for shipment of the packaged product. Hereby, ordinarily such final article processing and/or packaging procedures are implemented while the articles are conveyed to the workstations in a continuously advancing motion; in effect, through the intermediary of a continuous motion conveyor arrangement. Consequently, in order to ensure a continuous flow of uniformly spaced articles to such final processing workstations, it becomes necessary to be able to interface the intermittently advancing or indexing conveyor with the continuous motion conveyor which conducts the articles towards the workstations, through the interposition of interfacing structure between the respective conveyors so as to automatically convert the intermittent or batchwise flow of articles discharged from the conveyor of the indexing motion machine into a continuous flow of uniformly spaced articles.

SUMMARY OF THE INVENTION

In order to achieve this purpose, the present invention contemplates the provision of an interfacing conveyor which is arranged intermediate the discharge end of the indexing or intermittently advancing conveyor of the indexing motion machine and a proximate receiving end of a continuously advancing receiving conveyor or continuous motion machine which conducts the articles to further workstations.

Pursuant to a specific embodiment, the interfacing conveyor is essentially a continuously moving conveyor which is advanced in a path of travel defining a closed loop and at a predetermined constant rate of speed in synchronism with that of the product-receiving conveyor of the continuous motion machine so as to continually deliver a constant flow of uniformly spaced articles of manufacture or product thereto. Inasmuch as the interfacing conveyor receives the articles of manufacture which are advanced in an intermittent or batchwise mode by the indexing conveyor of the indexing motion machine, the ability of the interfacing conveyors to automatically transfer the articles in a continual and uniform flow to the receiving conveyor is obtained in that a secondary reciprocatory or oscillating motion is superimposed on the continuous path of travel of the portion of the interfacing conveyor which is located proximate the discharge end of the indexing motion conveyor whereby upon appropriate correlation in the movements between the reciprocatory motion and the continual advance of the interfacing conveyor there is produced a synchronous relationship between the advancing speed of the discharge end of the indexing conveyor and that of the adjoining portion of the interfacing conveyor to enable the latter to receive a continuous and uniformly spaced flow of articles from the indexing conveyor.

To accomplish this purpose, the interfacing conveyor, which may be an endless chain belt entrained over a number of spaced rollers or sprocket wheels positioned to define the loop-shaped path of travel thereof, has a driving arrangement, such as an electric motor drive and belt and pulley system operatively connected therewith, wherein an eccentric element which is preferably in the shape of a cam plate rotatably mounted on a shaft driven by the driving arrangement imparts a reciprocatory motion to the structure mounting the rollers or sprocket wheels supporting the interfacing conveyor in a region proximate the discharge end of the indexing conveyor, thereby correlating the motion thereof with the indexing conveyor such that the assumption by the interfacing conveyor of batchwise advanced articles transferred thereto from the indexing conveyor is carried out in a manner allowing for the uniformly sequenced and evenly spaced positioning of such articles along the run of the interfacing conveyor advancing towards the receiving conveyor. In this connection, in order to facilitate the transfer of the batchwise advanced articles from the indexing conveyor to the interfacing conveyor, an article-spacing belt is located above and below the discharge end of the indexing conveyor, and is indexed in synchronism with the intermittent advance of the indexing conveyor but at a somewhat higher forward speed so as to essentially "push" the articles from the discharge end of the indexing conveyor into the run of the interfacing conveyor. Thereafter, upon these articles being continually advanced by the interfacing conveyor to the receiving end of the continuous motion receiving conveyor, they are then transferred onto the latter; for instance, through the action of cooperating transfer fingers or paddles, in a continuous uniform sequence for conveyance to subsequent (optional) processing apparatus and/or treating and packaging stations, as needed.

Pursuant to a further feature of the interfacing conveyor, the loop-shaped path of travel thereof between the discharge end of the indexing conveyor and the continuous motion receiving conveyor also causes the articles to be inverted during their conveyance by the interfacing conveyor, enabling visual inspection of the opposite surface of each article as it is deposited onto the receiving conveyor.

As exemplified by a preferred embodiment of the invention, two or more of the above-mentioned conveyor arrangements may be combined to operate in concurrent side-by-side or tandem operation so as to provide a plurality of production lines controlled by a single cam plate and driven by a unitary driving arrangement. This, of course, will significantly increase the output and productivity of an article-manufacturing apparatus.

Although there may be some types and classes of apparatus currently in commercial use which correlate or effectively synchronize operations between indexing and continuous motion machines employed in the manufacture and processing of various types of articles of manufacture, at this time the only widely known usage of such apparatus is encountered in connection with diaper or sanitary products stacking machinery, wherein diaper or sanitary product stackers receive the diapers or sanitary products in a continuous motion and deliver stacks of such products in an indexing motion.

Accordingly, it is a primary object of the present invention to provide an apparatus for converting an indexing advancing motion of articles of manufacture into a continuous advancing motion.

Another object of the invention resides in the provision of an apparatus of the type described herein in which an interfacing conveyor is operatively interposed between the discharge end of an indexing motion conveyor intermittently or batchwise advancing articles of manufacture to the interfacing conveyor which communicates with an article receiving end of a continuous motion conveyor so as to enable a continuous and uniformly spaced flow of such articles to further workstations and/or packaging apparatus.

A still further object of the invention resides in the provision of an interfacing conveyor which continually moves in a loop-like path of travel intermediate the indexing conveyor and the continuous motion receiving conveyor, in which the interfacing conveyor has a reciprocatory or oscillating motion superimposed on the continuous advance thereof in the region proximate the discharge end of the indexing conveyor so as to correlate transfer to the interfacing conveyor of intermittently advanced or batchwise-spaced articles on the indexing conveyor in a manner whereby such articles are transferred in a uniformly spaced mode onto the interfacing conveyor for continued movement and transfer to the continuous motion receiving conveyor of the apparatus.

Another specific object of the invention resides in the provision of an apparatus as described herein, wherein the interfacing conveyor has the oscillatory or reciprocating movement superimposed onto the path of advancing travel thereof proximate the discharge end of the indexing conveyor through the intermediary of a driven eccentric element, or rotatable cam plate, which will synchronize the reciprocatory movement with the advance and transfer of such articles from the indexing conveyor to the interfacing conveyor, and to thereby allow for an automatic continuous flow of articles from the interfacing conveyor to the continuous motion receiving conveyor.

Finally, a further object of the invention is to provide a method of utilizing the inventive apparatus for the interfacing of an indexing motion machine with a continuous motion machine, as described herein.

BRIEF DESCRIPTION OF THE DRAWINGS

Reference may now be had to the following detailed description of a preferred embodiment of the invention, taken in conjunction with the accompanying drawings; in which.

DETAILED DESCRIPTION

Figure 1:
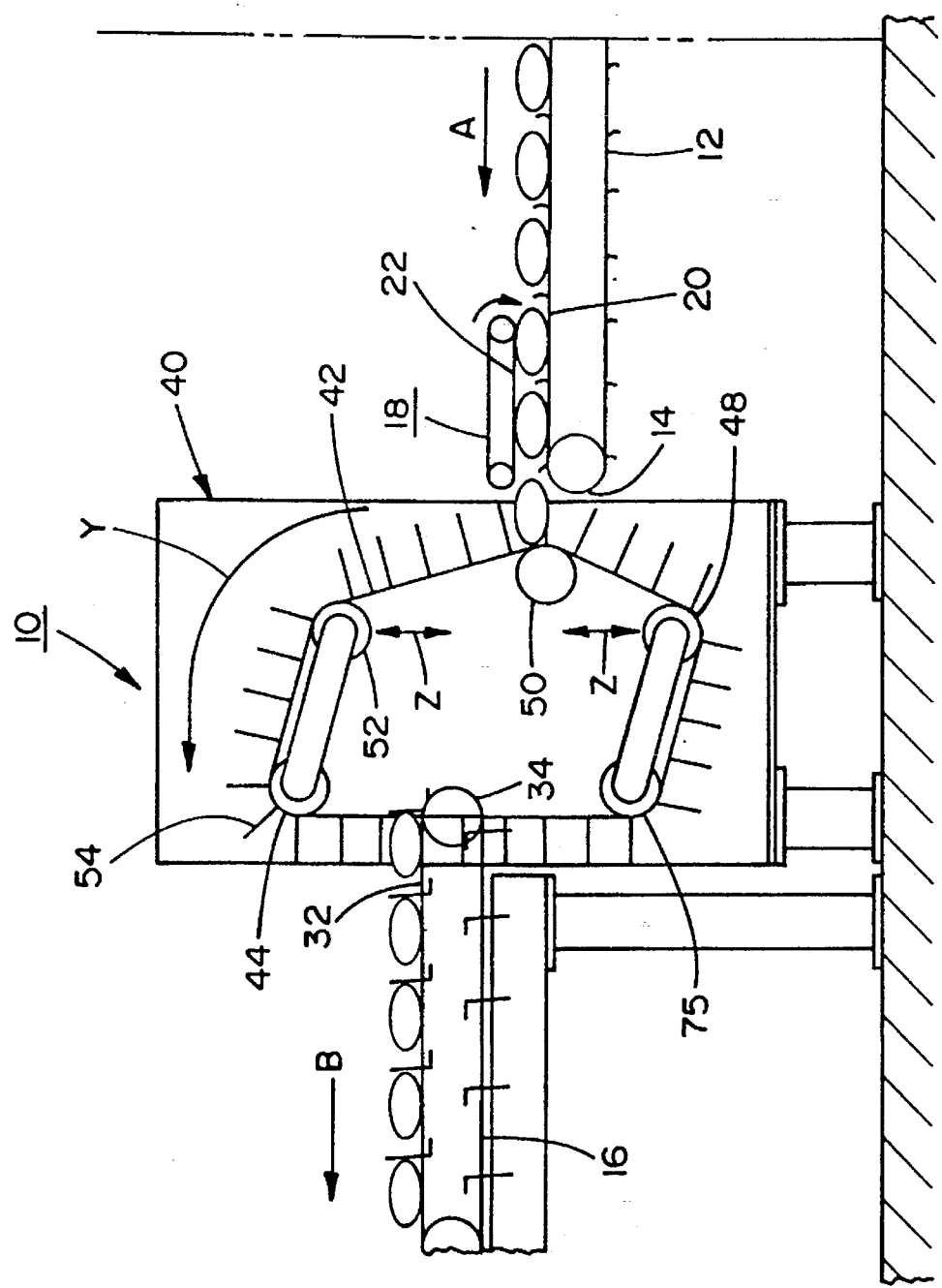
FIG. 1 illustrates a generally schematic representation of a segment of a manufacturing system for articles of manufacture incorporating an interfacing conveyor between an indexing motion machine and a continuous motion machine for synchronizing the advance of articles between the machines, pursuant to the invention.
Figure 4:
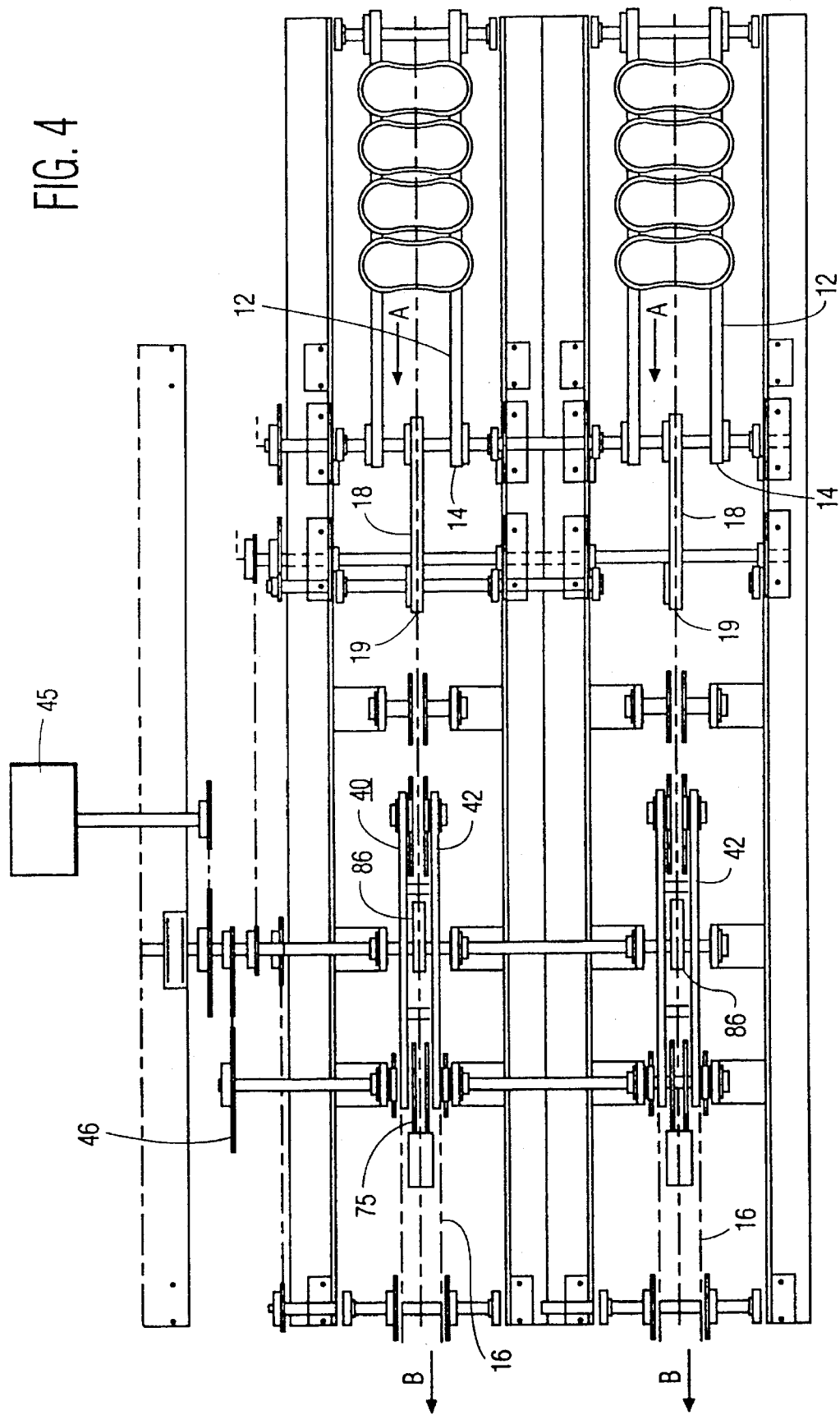
FIG. 4 illustrates, on an enlarged scale, a top plan view of an operating line comprising two indexing conveyors, two interfacing conveyors and two receiving conveyors arranged in side-by-side parallel relationship.

Referring now in more extensive particularity to the drawings which are representative of an embodiment of the inventive apparatus, FIG. 1 illustrates a generally diagrammatic overall representation of a conveying system 10 for successively advancing a plurality of articles of manufacture between an indexing motion machine and a continuous motion machine. Although the conveying system 10, for purposes of simplicity, is described with regard to a single conveyor or article production line, the apparatus is adapted to be constructed for operation with a plurality, such as two or more, side-by-side conveyor lines. These conveyor lines, as described in detail hereinbelow, operate in unison and may be driven from a common motive power source so as to form a plurality of integrated article production lines. FIG. 4 illustrates a conveying system comprising two side-by-side conveyor lines.

Figure 2:
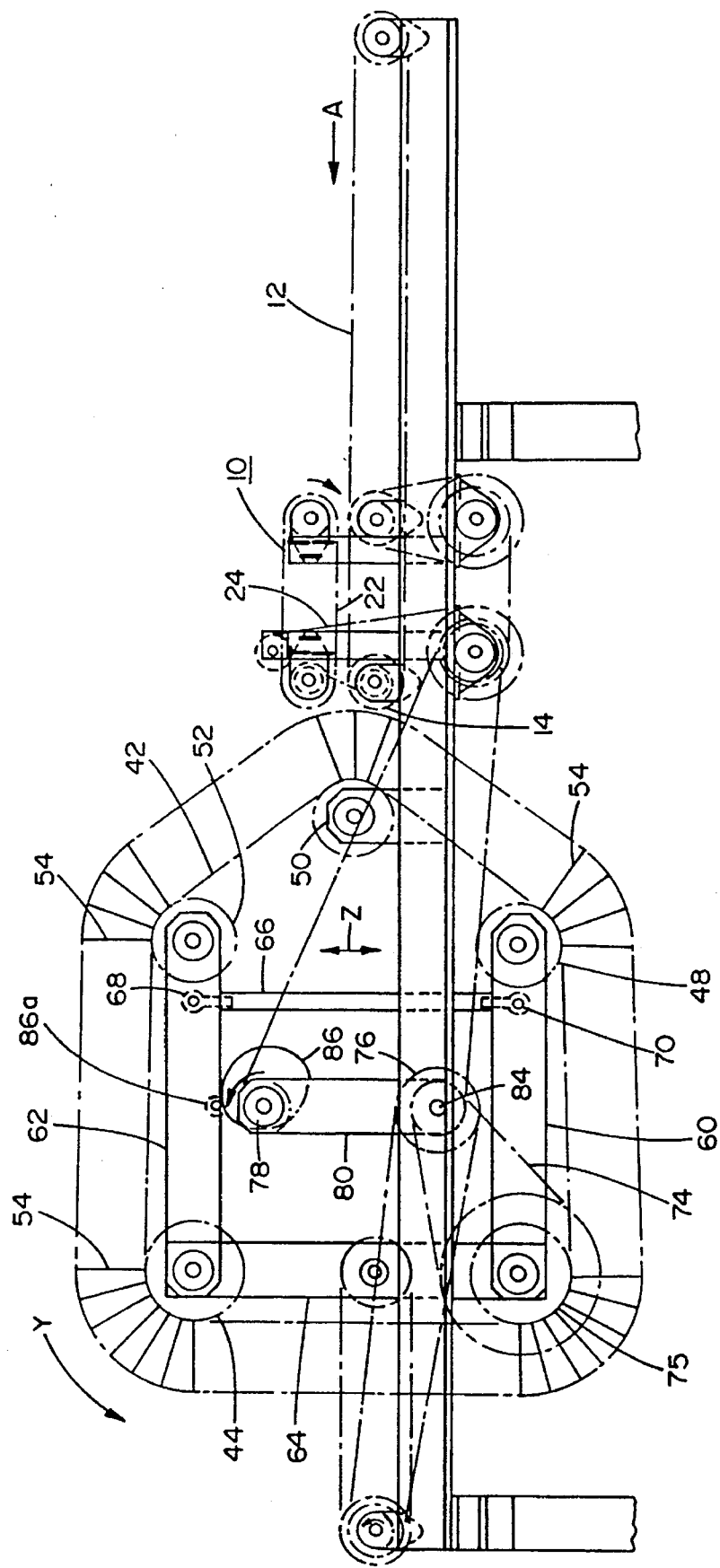
FIG. 2 illustrates, on an enlarged scale, a side elevational view of the inventive interfacing conveyor.

The conveying system 10, as shown in more specific detail in FIG. 2, basically although not exclusively limited thereto, includes a first conveyor chain belt 12 having spaced upstanding paddles or fingers mounted to receive articles of manufacture from a manufacturing machine (not shown) ordinarily operating in an indexing mode, and wherein the conveyor 12 advances the articles, received in batches, along the direction of arrow A in an essentially intermittent or indexing motion towards a discharge end 14 of the conveyor 12 in correlation with the indexing operation of the article manufacturing machine (not shown), so as to resultingly provide an intermittent or batchwise forward feed of the articles. Located at a distance from the discharge end 14 of the indexing conveyor 12 is a receiving conveyor 16, preferably in the form of a conveyor chain having a plurality of spaced paddles or fingers thereon, which is adapted to advance the articles along in the direction of arrow B in a continuous motion towards various optional workstations as may be required, such as for implementing the additional processing or treatment of the articles and/or their packaging.

Arranged above the discharge end 14 of the indexing conveyor 12 is a short article-spacing belt 18 having a lower run 22 extending in close parallel spaced relationship with the upper run 20 of lower short article-spacing belt 18A proximate the discharge end 14 of indexing conveyor 12. The external surface 22 of 18 and the external surface 20 of 18A are adapted to frictionally contact the articles being sequentially advanced in the direction of arrow A on the indexing conveyor 12. The article-spacing belts 18 and 18A are operatively connected to indexing conveyor 12 by means of a suitable belt and pulley arrangement 24 in order to be advanced in synchronism with the intermittent forward motion of the indexing conveyor 12, but at a faster rate of advance than conveyer 12, so as to essentially "push" or shove the articles in succession, responsive to frictional contact by the surfaces 22 and 20, from the discharge end 14 into the run of an interfacing conveyor, as described hereinbelow.

In accordance with particular utilizations of the invention, the articles of manufacture may be essentially shallow-configured flat pads, soaps, sanitary products, or in effect, practically any kind of articles which are basically flat or shallow in nature, and which render themselves to be sequentially conveyed.

A problem which is frequently encountered and which is inventively solved herein resides in automatically interfacing or synchronizing the indexing motion or intermittent article advance of the indexing conveyor 12 with the continuous motion or continual article advance of the receiving conveyor 16 so as to ensure a uniform and constant feed of articles from the conveyor 16 to any subsequent continuously operating workstations (not shown) of the system 10 which are located downstream of the discharge end of the conveyor 16.

In order to be able to implement the desired continuous feed of articles of manufacture by the receiving conveyor 16 to the various (optional) workstations notwithstanding the indexing operation of conveyor 12, an interfacing conveyor arrangement 40 is operatively interposed between the article discharge end 19 of the article-spacing belts 18 and 18A and an article-receiving end 34 of the continuous motion receiving conveyor 16, which interfacing conveyor arrangement 40 is adapted to convert the movement of the intermittently or batchwise supplied articles from the discharge end 14 of the indexing conveyor 12 into a uniformly spaced and constant flow at a discharge end of the receiving conveyor 16 to which the articles are transferred from the arrangement 40.

The interfacing conveyor arrangement 40 essentially comprises an endless conveyor chain belt 42 which is continuously advanced at a constant rate of speed in the direction of arrow Y while being entrained over a plurality of rollers or sprocket wheels 44, 46, 48, 50 and 52 journaled on the framework of the interfacing conveyor structure, and which cause the conveyor belt 42 to travel in a closed loop in the shape of a polyhedron, as is illustrated in FIG. 2 of the drawings. The conveyor belt 42 is equipped along the length thereof with a plurality of uniformly spaced and radially outwardly extending paddles or finger members 54 in which the interspace between adjacent finger members 54 is adapted to have, respectively, transferred thereto an article of manufacture picked up from the discharge end 14 of the indexing conveyor 12, with such articles being successively pushed from the discharge end 14 of indexing conveyor 12 by the contacting surface 22 on the lower run of article-spacing belt 18 and the upper run of belt 18A into the spaces between the paddles 54, thereby transferring the articles from the conveyor 12 to the interfacing conveyor belt 42. At this location, the path of movement of the interfacing conveyor belt 42 about the periphery of roller or sprocket wheel 50 causes the adjacent paddles 54 to diverge, thereby producing a so-called "window opening" widening the receiving interspace there between, which will facilitate the receipt of articles discharged from the indexing conveyor 12. Inasmuch as the conveyor 12 advances the articles in an indexing or intermittent motion to thereby provide an article feed in batches, whereas the interfacing conveyor belt 42 is advanced in a continuous motion about the loop path of travel thereof in correlation with the advancing speed of the receiving conveyor 16, ordinarily the articles transferred from indexing conveyor 12 at its discharge end 14 to the interfacing conveyor belt 42 would not fill each and every interspace present between adjacent fingers or paddles 54 so as to, in essence, potentially produce a non-uniform flow or intermittent supply of such articles to the receiving conveyor 16 and, resultingly, to any workstations of the system 10.

In order to ensure an interfacing or synchronous operation between the indexing motion machine or essentially the indexing conveyor 12 and the continuous motion receiving conveyor 16, the interfacing conveyor belt 42, in the region thereof adjacent the discharge end 14 of the indexing conveyor 12 from which it receives the batches of articles in response to the action of belts 18 and 18A, is imparted a reciprocating or oscillatory motion along the direction of the double-headed arrow Z superimposed on the continuous advancing movement of the interfacing conveyor belt 42 along the direction Y so as to either speed up or slow down the movement of the finger members or paddles 54 on the interfacing conveyor belt 42 relative to the infeed of articles from the indexing conveyor 12 at its discharge end 14 in a controlled mode, such oscillatory movement creating an intermittent or indexing motion of the interfacing conveyor belt 42 at that location, adapted to enable articles to be transferred into each and every interspace between adjacent finger members 54 on interfacing conveyor belt 42 moving past the discharge end 19 of article-spacing belts 18 and 18A. Inasmuch as this composite motion (along arrows Y and Z) is imparted to the interfacing conveyor belt 42 only proximate its operative connection with the discharge end 19 of article-spacing belts 18 and 18A, whereas the remaining sections of the conveyor belt 42 remain in continuous advancing motion in the direction of arrow Y so as to produce a continuous advancing movement for the articles at the infeed end 34 of receiving conveyor 16 at which they are transferred thereto from the interfacing conveyor belt 42, this facilitates an interfacing action between the different types of movements of conveyor belts 12 and 16 and article-spacing belts 18 and 18A, whereby the batchwise or indexed feed of articles by the conveyor 12 is converted into a continuous advance and uniform spacing of articles by the interfacing conveyor arrangement 40 to the infeed end 34 of continuous motion receiving conveyor 16. Moreover, the loop-shaped path of travel of the chain belt 42 of interfacing conveyor arrangement 40 whereby the articles are transported in an initially upward orientation from the discharge end 19 of article-spacing belts 18 and 18A and subsequently in a downwardly oriented direction as shown by arrow Y, causes the articles to be inverted on the interfacing conveyor belt 42 prior to being transferred onto the receiving conveyor 16. This enables visual inspection of the opposite surface of each such articles relative to the initial orientation thereof on the indexing conveyor 12.

Reverting to the structure of the interfacing conveyor arrangement 40 in more extensive detail, and particularly with reference to FIGS. 2 and 3 of the drawings, the articles of manufacture which; for example, may be relatively flat or shallow pads or products as mentioned hereinabove, are transported along the direction of arrow A on the upper run of the indexing conveyor 12, the latter of which consists of an endless conveyor chain belt having radially upwardly extending paddles or fingers spaced along the length thereof, and which is indexed or intermittently advanced towards its discharge end 14 in synchronism with the indexing operation and batchwise discharge of articles from a manufacturing apparatus (not shown) for producing such articles.

The oscillating or reciprocatory motion imposed on the interfacing conveyor belt 42 along double-headed arrow Z in the region proximate the discharge end 14 of the indexing conveyor 12 is obtained in that the rollers or sprocket wheels 48 and 52 are each respectively rotatably journaled at the free end of lever arms 60 and 62, which lever arms have their opposite ends on which there are respectively rotatably mounted the sprocket wheels 44 and 46, pivotably connected to opposite ends of a fixed vertical frame member 64 so as to form an essentially C-shaped frame structure in which the arms 60 and 62 are pivotable about their connecting points with frame member 64. Near the free ends of the bars 60 and 62 in proximity with the sprocket wheels 48 and 52, the frame members 60 and 62 are hingedly connected to the opposite ends of a linkage rod 66 at linkage points 68 and 70. Connected to a drive motor (not shown); for example, such as by means of a suitable belt and pulley arrangement 74, and which also drives the sprocket wheel 46 for advancing interfacing conveyor belt 42 along the direction of arrow Y, is a further pulley 76 which, in turn, is operatively connected with a pulley 78 through the intermediary of a drive belt 80. The pulleys 76 and 78 which are interconnected by means of the drive belt 80 are rotatably journaled on shafts 82 and 84, and in which the pulley 78 has a rotatable shaft mounting an eccentric 86, preferably in the shape of a plate cam, with the periphery thereof forming a camming surface contacting a cam follower 86a mounted proximate the lower edge of thè bar 62 of the frame structure.

Accordingly, during the continual advance along the direction of arrow Y of the interfacing conveyor belt 42 responsive to the rotation imparted to the pulley 75 and sprocket wheel 46 by the drive motor 45 (not shown), and the concurrent rotation imparted to the plate cam 86 responsive to the cooperative rotation of pulleys 76 and 78 imparted by belts 74 and 80, by appropriately configuring the peripheral camming surface of eccentric or plate cam 86 and correlating or synchronizing the speed of advance of the interfacing conveyor belt 42 with that of the indexing conveyor 12, the linkage rod 66 is reciprocated vertically along the direction of arrow Z so as to impart a vertical oscillatory movement to the rollers 48 and 52 designed to cause the superposition of an accelerated forward component of movement on the continuous advance of interfacing conveyor belt 42 proximate the discharge end 19 of article-spacing belts 18 and 18A, while the speed of advance of the interfacing conveyor belt 42 at the receiving conveyor 16 remains constant and unaffected by this oscillatory movement. This composite motion of the interfacing conveyor belt 42 proximate the discharge end 19 of article-spacing belts 18 and 18A is essentially synchronized with the indexing advance of the conveyor, such that batches of articles thereon are conducted towards the discharge end 14 of conveyor 12 and pushed sequentially into the interspaces present between the finger members or paddles 54 on the conveyor belt 42 by the action of article-spacing belts 18 and 18A so as to uniformly fill each and every interspace between adjacent finger members 54. As a result, there is obtained a continuous and sequentially uniform flow of articles along the direction of arrow Y of the interfacing conveyor arrangement 40 to the infeed end 34 of the continuous motion receiving conveyor 16 for transfer to the latter.

Concurrently, the loop-shaped path of travel in an upward and subsequent downward motion of the articles while being conveyed on the interfacing conveyor belt 42 causes the articles to be inverted so that upon transfer of the articles onto the receiving conveyor 16, they are essentially rotated through an angle of 180° relative to their positioning on the indexing conveyor 12, thereby enabling visual inspection of the reverse side of each article.

Figure 3:
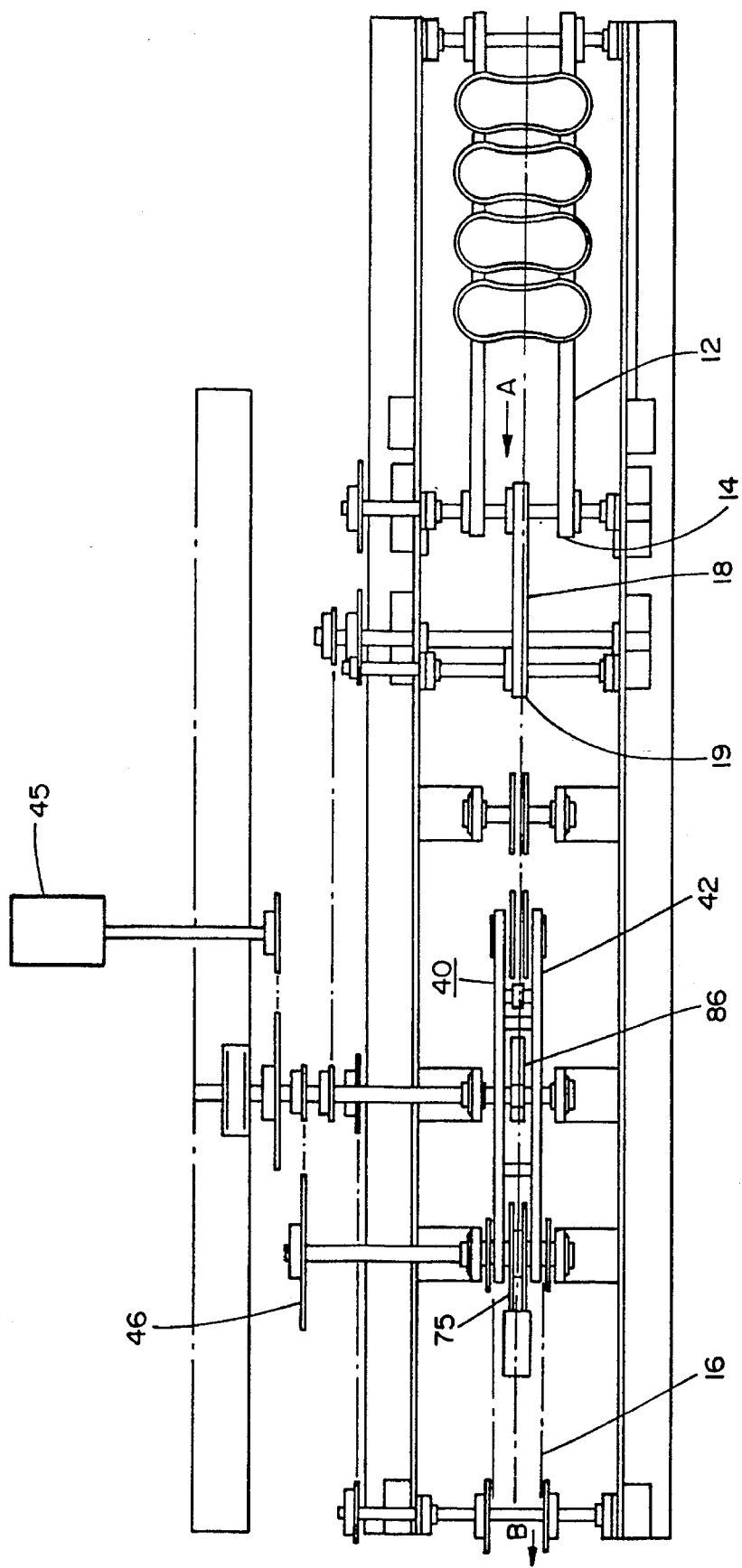
FIG. 3 illustrates, on an enlarged scale, a top plan view of a single operating line for the interfacing conveyor of FIG. 2.

Pursuant to a particular physical application of the inventive interfacing conveyor arrangement 40 for the interfacing of an indexing motion machine with a continuous motion machine, and referring particularly to FIG. 3, essentially two parallel lanes of pads are advanced towards the interfacing conveyor arrangement 40 in which each conveyor comprises two parallel chain belts. Hereby, although essentially only one production lane is illustrated, it is readily apparent that two or more lanes may be incorporated into a single operative arrangement to increase the productivity of the system.

In this particular instance, two lanes of four pads each, representing the articles of manufacture, are equally spaced on 5 ⅛" centers in the machine direction along the traveling length of the indexing conveyor 12, such pads being separated by respectively upstanding finger members or paddles. Hereby, adjacent lanes of the conveyor system are spaced 7 ¾" apart in the cross-machine direction, thereby forming an index of eight pads which arrive at the infeed or the discharge end 14 of the conveyor 12 adjacent the interfacing conveyor chain 42 at a rate, for instance, of 15 to 25 indexes per minute for the indexing conveyor 12.

The conveyor system which includes two lanes of equally spaced conveyor belts in side-by-side operation includes plastic finger members or paddles 54 mounted equally spaced from each other along the conveyors, the latter of which may each be a suitable roller chain. Hereby, the cross-machine spacing of these paddle-mounting conveyor chains is identical to that of the various pads. Thus, the interfacing conveyor chain belt 42, which is constituted from the paddle chains, forms two closed loops along its path of travel around the five chain sprocket wheels 44 through 52, and is essentially driven by means of the motor drive (not shown) in a closed continuous motion. The especially configured cam plate 86 causes the infeed side of the interfacing conveyor belt 42 proximate the discharge end 19 of article-spacing belts 18 and 18A to be raised up along arrow Z over specified periods of time in synchronism with the indexes or cycles of the indexing machine forming the articles or pads. This motion is produced by the pivotal movement of arms 60, 62 about pivot points connecting the arms with frame member 64 so as to; resultingly, either lower or raise the sprocket wheels 48 and 52 in conformance with the configuration of the rotating eccentric or cam plate 86.

Thus, while the indexing pad manufacturing apparatus is indexing, the cam plate 86 of the interfacing conveyor arrangement 40 causes the receiving end of the interfacing conveyor chain belt 42 adjacent the discharge end 19 of article-spacing belts 18 and 18A to lift up in the upward direction of arrow Z, such that each pad in each lane is transferred into the interspaces between adjacent paddles or finger members 54 on the interfacing conveyor belt 42. While the indexing apparatus or machine producing the pads is in its dwell period, the cam plate 86 acting on the cam follower 86a causes the arms 60, 62 acting about the pivot points connecting the arms with frame member 64 to pivot down. This movement causes the sprockets 48, 52 to move downward along arrow Z at a rate of speed equal to the advancing rate of belt 42. This, in essence, produces the effect of "freezing" or stopping the relative advancing motion of the interfacing conveyor belt 42 with regard to the adjacent discharge end 19 of article-spacing belts 18 and 18A, enabling the interfacing conveyor belt 42 to wait for the subsequent feed cycle of the pad manufacturing apparatus.

While the one portion of the interfacing conveyor belt 42 is essentially "waiting" for the next advancing cycle of the indexing conveyor 12, the pads already accumulated on the interfacing conveyor belt 42 intermediate neighboring paddles or finger members 54 are continually and uniformly being transferred and discharged to the infeed end 34 of the receiving conveyor 16, one pad at each time in each lane of the system; for example, at the rate of 60 to 90 pads per minute. The interfacing conveyor is of a sufficient length and provided with a suitable number of finger members or paddles 54 along the circumference thereof so as to enable the accumulation of up to six indexes or cycles of pads being transferred thereto from the indexing conveyor 12.

In essence, the basic advantages of the interfacing system 10 comprise the ability of providing an interfacing operation between indexing motion and continuous motion machines in a controlled steady state; and in allowing for a labor reduction in that the foregoing sequence of operation is fully automated.

While there has been shown and described what are considered to be preferred embodiments of the invention, it will of course be understood that various modifications and changes in form or detail could readily be made without departing from the spirit of the invention. It is therefore intended that the invention be not limited to the exact form and detail herein shown and described, nor to anything less than the whole of the invention herein disclosed as hereinafter claimed.

What is claimed is:

1. An apparatus for converting an indexing motion of advance for a sequence of intermittently supplied articles of manufacture into a continuous motion of advance; said apparatus comprising:

(a) at least one indexing conveyor for receiving and transporting said intermittently supplied articles towards a discharge end of said conveyor;

(b) at least one receiving conveyor advancing in a continuous motion for continually transporting said articles to at least one workstation communicating with a discharge end of said conveyor;

(c) at least one interfacing means operatively connected between said indexing conveyor and said continuous motion conveyor receiving said intermittently advanced articles from said indexing conveyor and converting the rate of advance of said articles towards said receiving conveyor to produce a uniform and continuous flow of said articles; and (d) article-spacing means operatively connected to said indexing conveyor for transferring said articles from the discharge end of said indexing conveyor to said interfacing means at a higher rate of speed than the advance of said articles on said indexing conveyor.

2. An apparatus as claimed in claim 1, wherein said article-spacing means comprises a conveyor belt having an indexing advance in synchronism with the advance of said indexing conveyor, said conveyor belt being advanced at a higher rate of speed than the advance of said indexing conveyor, and means on said conveyor belt for transferring articles from the discharge end of said indexing conveyor to said interfacing means.

3. An apparatus as claimed in claim 2, wherein said interfacing means comprises a continuous motion conveyor advancing along a closed loop of travel at a speed which in synchronism with the speed of advance of said receiving conveyor; and means for correlating the movement of said interfacing means with the intermittent advance of said articles by said indexing conveyor in the region of said interfacing means proximate the discharge end of said indexing conveyor such that articles discharged in batches from said indexing conveyor are transferred to the conveyor of said interfacing means to facilitate a uniform flow of articles to said receiving conveyor.

4. An apparatus as claimed in claim 3, wherein said interfacing continuous motion conveyor comprises means for inverting said articles during conveyance thereof between said indexing conveyor and said receiving conveyor.

5. An apparatus as claimed in claim 4, wherein said indexing conveyor, said receiving conveyor and said interfacing continuous motion conveyor are each equipped with a plurality of radially extending paddle-shaped means spaced along the length of each said conveyor, said protuberance each being contacted by respectively one said article so as to advance said articles in sequence from said indexing conveyor to said interfacing conveyor and from said interfacing conveyor to said receiving conveyor.

6. An apparatus as claimed in claim 5, wherein said inverting means on said interfacing conveyor is formed by said protuberances.

7. An apparatus as claimed in claim 3, comprising at least two of said interfacing conveyors, interfacing conveyors, and receiving conveyors arranged in side-by-side parallel relationship for simultaneous tandem operation of a plurality of production lines for said articles.

8. A method for converting an indexing motion of advance for a sequence of intermittently supplied articles of manufacture into a continuous motion of advance; said method comprising:

(a) intermittently advancing at least one indexing conveyor for receiving and transporting said intermittently supplied articles towards a discharge end of said conveyor;

(b) advancing at least one receiving conveyor in a continuous motion for continually transporting said articles to at least one workstation communicating with a discharge end of said conveyor;

(c) operatively interconnecting at least one interfacing means between said indexing conveyor and said continuous motion conveyor receiving said intermittently advanced articles from said indexing conveyor for converting the rate of advance of said articles towards said receiving conveyor to produce a uniform and continuous flow of said articles; and (d) imparting a higher rate of speed to the articles proximate a discharge end of said indexing conveyor than the speed of advance of said articles on said indexing conveyor for transferring said articles to said interfacing means.

9. A method as claimed in claim 8, said interfacing means comprising a continuous motion conveyor; wherein said conveyor is advanced along a closed loop of travel at a speed which is in synchronism with the speed of advance of said receiving conveyor; and correlating the movement of said interfacing means with the intermittent advance of said articles by said indexing conveyor in the region of said interfacing means proximate the discharge end of said indexing conveyor such that articles discharged in batches from said indexing conveyor are transferred to the convey of said interfacing means to facilitate a uniform flow of articles to said receiving conveyor.

10. A method as claimed in claim 9, wherein said interfacing continuous motion conveyor inverts said articles during conveyance thereof between said indexing conveyor and said receiving conveyor.

11. A method as claimed in claim 10, wherein said indexing conveyor, said receiving conveyor and said interfacing continuous motion conveyor are each equipped with a plurality of radially extending paddle-shaped means spaced along the length of each said conveyor, said protuberance each being contacted by respectively one said article so as to advance said articles in sequence from said indexing conveyor to said interfacing conveyor and from said interfacing conveyor to said receiving conveyor.

12. A method as claimed in claim 11, wherein said inverting of articles on said interfacing conveyor is effected by said protuberances.

13. A method as claimed in claim 8, comprising at least two of said interfacing conveyors, interfacing conveyors, and receiving conveyors arranged in side-by-side parallel relationship for simultaneous tandem operation of a plurality of production lines for said articles.

* * * * *

UNITED STATES PATENT AND TRADEMARK OFFICE
CERTIFICATE OF CORRECTION

PATENT NO. : 5,611,418
DATED : March 18, 1997
INVENTOR(S) : Thomas J. Helmstetter It is certified that error appears in the above-indentified patent and that said Letters Patent is hereby corrected as shown below:

Title page, item [73] should read--

- Assignee: Chicopee, Inc.
  North Charleston, SC

Signed and Sealed this

Sixteenth Day of December, 1997

*Attest:*

BRUCE LEHMAN

*Attesting Officer*     *Commissioner of Patents and Trademarks*